(12) United States Patent
Emigh

(10) Patent No.: US 7,884,713 B1
(45) Date of Patent: *Feb. 8, 2011

(54) ALERTING BASED ON LOCATION

(76) Inventor: Aaron T. Emigh, 762 Judith Court, Incline Village, NV (US) 89451

( * ) Notice: Subject to any disclaimer, the term of this patent is extended or adjusted under 35 U.S.C. 154(b) by 0 days.

This patent is subject to a terminal disclaimer.

(21) Appl. No.: 12/688,910

(22) Filed: Jan. 17, 2010

Related U.S. Application Data

(63) Continuation of application No. 11/895,152, filed on Aug. 22, 2007, now Pat. No. 7,696,868.

(60) Provisional application No. 60/839,216, filed on Aug. 22, 2006.

(51) Int. Cl.
*G08B 1/08* (2006.01)
(52) U.S. Cl. .................................. 340/539.13
(58) Field of Classification Search ............ 340/539.13, 340/686.6, 309.16, 996, 573.4; 455/456.1, 455/457
See application file for complete search history.

(56) References Cited

U.S. PATENT DOCUMENTS

| | | | | |
|---|---|---|---|---|
| 6,484,033 | B2 * | 11/2002 | Murray | 455/456.3 |
| 6,680,675 | B1 * | 1/2004 | Suzuki | 340/988 |
| 6,850,837 | B2 * | 2/2005 | Paulauskas et al. | 701/200 |
| 7,039,420 | B2 * | 5/2006 | Koskinen et al. | 455/456.1 |
| 7,394,405 | B2 * | 7/2008 | Godden | 340/996 |

* cited by examiner

*Primary Examiner*—Phung Nguyen

(57) ABSTRACT

In some embodiments, techniques for processing an alert may include receiving a specification of a first location, creating an alert, associating the first location with the alert, determining a first current location as a second location, wherein determining the second location follows receiving the specification of the first location and precedes determining a third location, determining that the second location does not match the specification of the first location, determining a second current location as the third location, determining that the third location matches the specification of the first location, and presenting information relating to the alert.

54 Claims, 4 Drawing Sheets

ALERTING BASED ON LOCATION

CROSS REFERENCE TO RELATED APPLICATIONS

This application is a continuation of co-pending U.S. patent application Ser. No. 11/895,152, entitled LOCATION-BASED ALERTING, filed Aug. 22, 2007, now U.S. Pat. No. 7,696,868, which is incorporated herein by reference for all purposes, which claims priority to U.S. Provisional Patent Application No. 60/839,216, entitled INFORMATION PROCESSING, filed Aug. 22, 2006, which is incorporated herein by reference for all purposes.

FIELD OF THE INVENTION

The present invention relates generally to the area of location-aware information processing. More specifically, techniques for alerting a user based in whole or in part on a location are disclosed.

BACKGROUND OF THE INVENTION

Technology for determining location has become small and inexpensive, facilitating the creation of location-aware devices. Frequently, a reminder to perform a task or a reminder of an opportunity relating to a location would be helpful to have in the future. Current devices and computer software contain various forms of alerting, such as calendar programs, to-do lists, etc. However, current technologies for reminders and scheduling do not permit association with a location. This results in the inability of users to create alerts that will trigger when which they are likely to be most useful.

Accordingly, it would be useful to have alerting capabilities that can take locational information into account.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
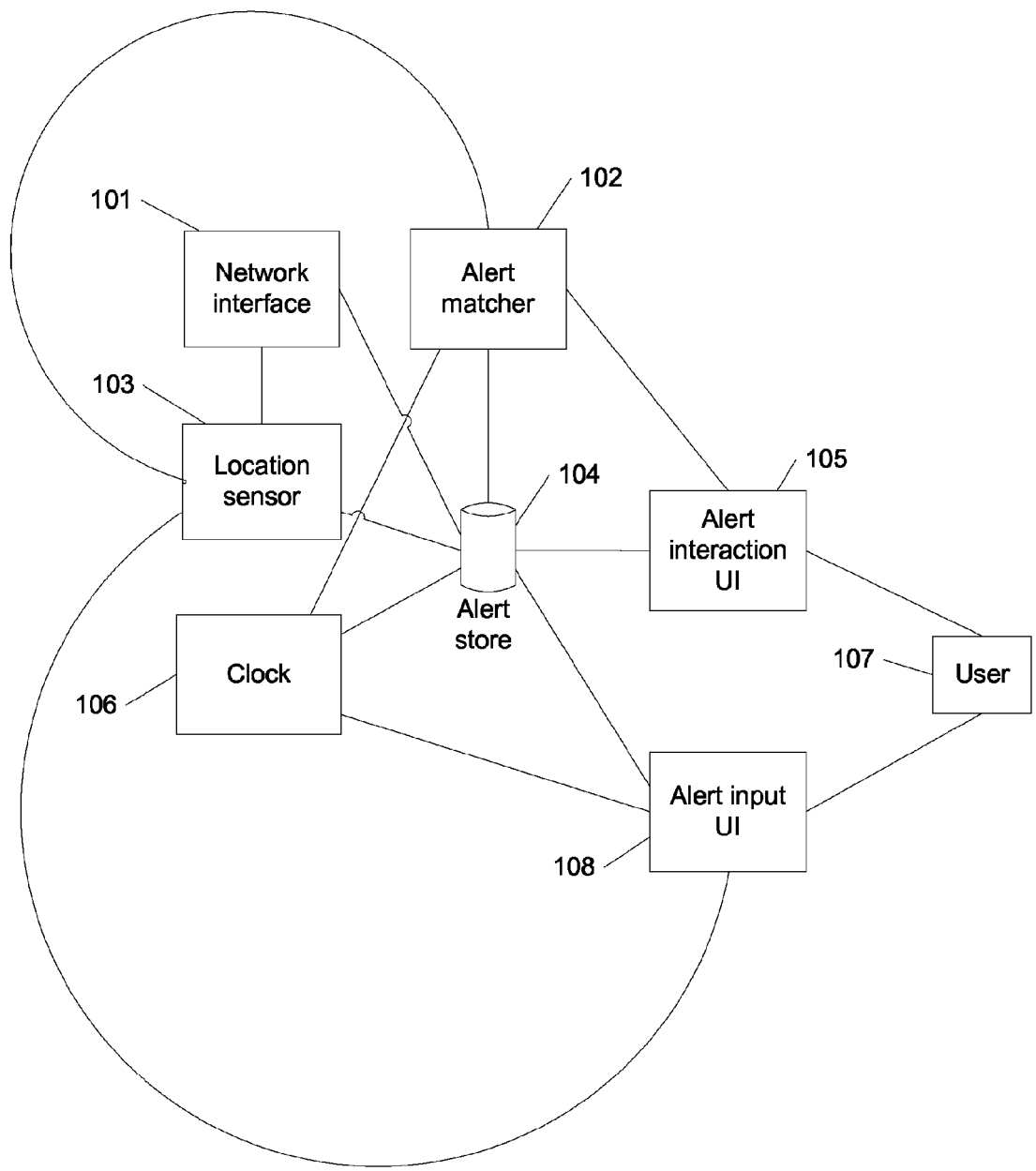
FIG. 1 is a diagram of a system for location-based alerting, according to some embodiments.

FIG. 1 is a diagram of a system for location-based alerting, according to some embodiments. In this example, a network interface 101 may in some embodiments receive information relating to an alert, and/or a location. For example, an alert may be received and/or transmitted over a network such as a wireless network (for example, a Bluetooth, GPRS or 802.11 wireless network) from or to an external device, such as a device in which an alert has just been entered or a device which may store the alert. An alert so received may be stored in an alert store 104.

An alert matcher 102 may access an alert store 104 to determine an alert close to the current time as received from a clock 106, and close to the current location as received from a location sensor 103. An alert matcher 102 may determine whether an alert associated with alert store 104 should be triggered based on proximity in time, space, and/or other criteria, and if so, may trigger the alert through alert interaction UI 105. An example of proximity in space to an alert is determining that the current location is within a certain region, such as a distance, from a location specified in the alert, having been outside that region (e.g. further that that distance from the location specified in the alert) since the alert was created.

A location sensor 103 may determine a current location. A location sensor 103 may be any component(s) capable of detecting or receiving a location. Examples of components capable of detecting a location include a GPS receiver, and one or more accelerometers or gyroscopes. An example of a component capable of receiving a location is network interface 101, through which a current location may be received, for example from a transmitter operating at a fixed location, or a transmitter capable of determining its own location. Another example of a component capable of receiving a location is a cellular receiver (which can also be network interface 101) that determines a location based on one or more cell towers with which it is communicating.

An alert store 104 may store one or more alerts. An alert refers herein to a location and optional time specification at which a notification such as a reminder may be made, with optional metadata such as a message, a region such as a radius from a location, and/or an indication that a region associated with the alert has been left since the alert was created. An example of an alert store 104 is a file on a filesystem, containing a characterization of one or more alerts. Another example of an alert store 104 is one or more tables in a database, containing data relating to one or more alerts. Another example of an alert store 104 is an in-memory data structure such as a list, array, sorted array, binary tree, or hash table, which may contain characterizations of one or more alerts and may be accessed and/or searched by time and/or location. In various embodiments, an alert store 104 may be associated with persistent storage such as a hard drive or flash memory, and/or with ephemeral storage such as DRAM.

An alert interaction user interface 105 may provide an indication that an alert has been triggered. Triggering an alert refers herein to detecting that any criteria required for the alert to be presented have been met. Examples of such a determination include determining that a specified or predetermined period of time has elapsed since the alert was created, that the current location is within a specified or predetermined region associated with a location at the time the alert was created, and/or that a previous location since the alert was created was outside a region associated with the alert. Various metadata fulfillment criteria relating to triggering an alert are discussed in conjunction with 308 of FIG. 3. An alert interaction UI 105 may receive an indication from alert matcher 102 that a match has been found, and may for example be passed an identifier associated with the alert and/or data associated with the alert. In some embodiments, an alert interaction UI 105 may retrieve additional data associated with the alert from alert store 104. Alert interaction UI 105 may present an indication that an alert has been triggered, and/or information relating to the alert, to a user 107. An example of an indication that an alert has been triggered is a visual indication, such as a popup window and/or text. Another example of an indication that an alert has been triggered is a noise, such as a beep or tone, or a speech synthesizer or playback of a recorded sound. Another example of an indication that an alert has been triggered is a vibration. Another example of an indication that an alert has been triggered is a hybrid of any of the foregoing indications, such as a combination of a noise and a visual indication. Examples of information relating to the alert include a location and/or time at which the alert was entered, a message associated with the alert, and other metadata associated with the alert.

An alert interaction UI 105 may process interactions with the presented alert, such as dismissing the alert (for example by selecting a "dismiss" or "OK" button on a user interface, or by pressing a physical button), or re-enabling the alert with a specified or predetermined temporal delay, or modifying and re-enabling the alert, for example as specified by a user or by re-enabling an indication that a region associated with the alert must be left and returned to before the alert will trigger again (for example by clearing an indication that the region has been left). An alert interaction UI 105 may transmit information relating to an alert to an external device, for example through network interface 101. For example, the fact an alert has been triggered and optionally metadata associated with the alert, such as a message, time and/or location at which the alert was created, may be transmitted to an external device such as a cellular phone or car stereo through an interface such as Bluetooth, which may in turn present the alert.

In some embodiments, a clock 106 may determine a current time 106, and may provide such a current time to alert matcher 102, alert input UI 108, and/or alert store 104. In some embodiments, a clock 106 may receive a current time, for example via a network interface such as network interface 101.

Alert input UI 108 may present an interface to user 107 wherein an alert may be input and stored in alert store 104. Examples of alert input UI 108 include a button, a screen allowing data input, a touch-sensitive screen, a microphone allowing voice input, and any other way that a user 107 may indicate that he or she wishes an alert to be created. Alert input UI 108 may receive a current location from location sensor 103 and/or a current time from clock 106, and may associate these with the alert. Alert input UI 108 may receive a message and/or other metadata associated with the alert, and may store the alert in alert store 104.

In some embodiments, the system of this FIG. 1 may be associated with a portable device, such as a PDA, cellular phone, navigation device, or notebook computer.

Additional details of the operation of the system of this FIG. 1 are discussed in conjunction with the remaining Figures.

Figure 2:
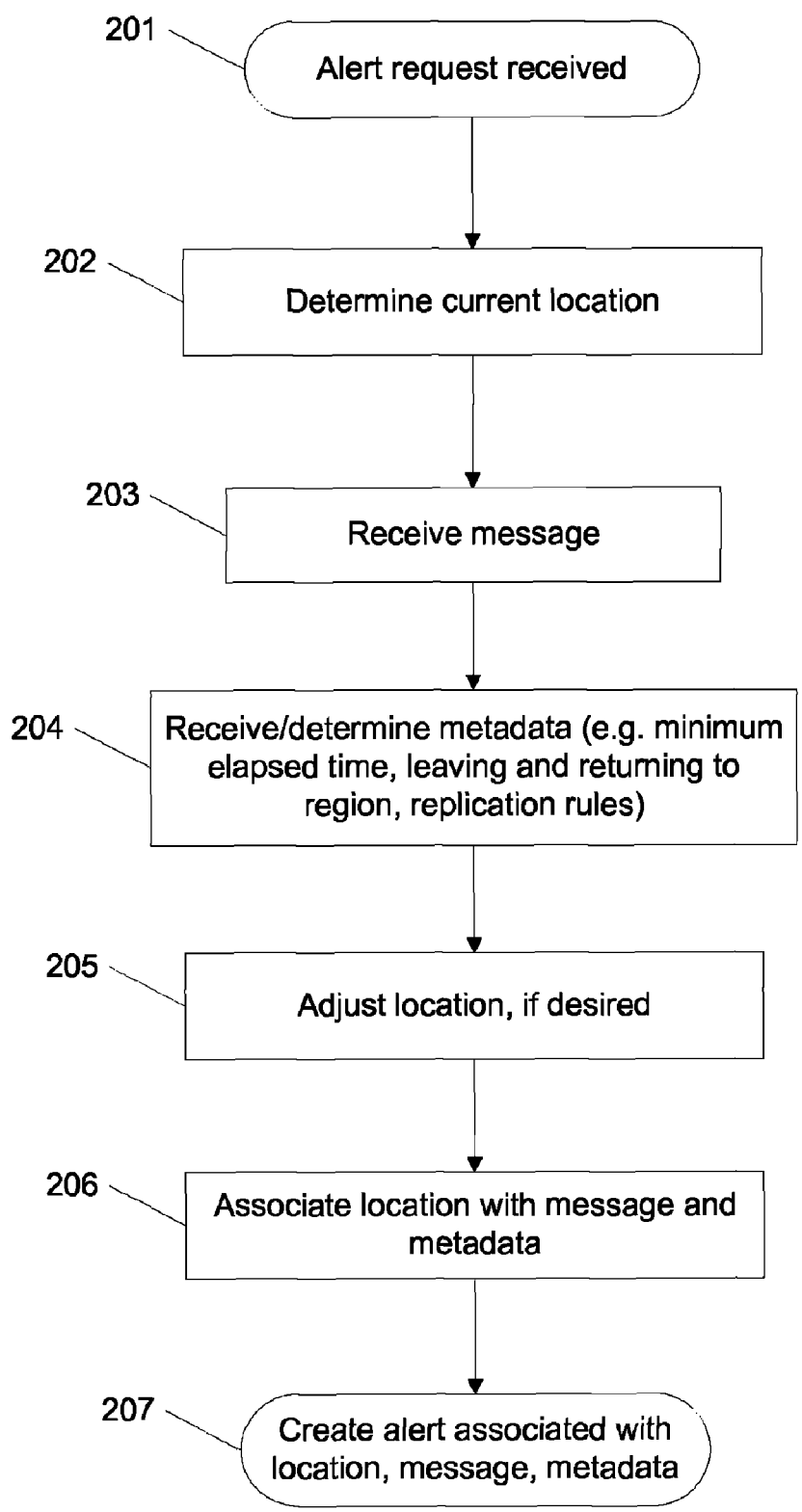
FIG. 2 is a flow diagram of a method for creating an alert, according to some embodiments.

FIG. 2 is a flow diagram of a method for creating an alert, according to some embodiments. In this example, an alert request is received (201). An example of receiving an alert request is to present a user interface such as a selectable menu item or combo box element, or a button, indicating that an alert such as a reminder is to be issued when the user is at or near the current location, for example by indicating "next time I am here" or similar text associated with a user interface element, and to receive a selection of a user interface element indicating a choice associated with the alert.

Another example of receiving an alert request is to receive the alert request from another device at which the request has been input or otherwise received. For example, cell phone or automotive navigational unit may receive the alert request from a PDA via a network interface such as network interface 101 of FIG. 1.

A current location may be determined (202). One example of determining a current location is to sense the current location using a location sensor 103 of FIG. 1, such as a GPS receiver. Another example of determining a current location is to receive a current location from an external device through a networking interface, as discussed in conjunction with location sensor 103 and network interface 101 of FIG. 1. Another example of determining a current location is to determine a cellular tower with which communications are or recently have been established.

One or more messages may be received (203). An example of a message is text which is intended to be shown when an alert is triggered. Another example of a message is a digital recording, such as a voice recording via a microphone, intended to be played or playable when an alert is triggered. In some embodiments, a message may be received in conjunction with the alert request, for example when receiving an alert request from an external device.

Various metadata may be received and/or determined (204). An example of metadata is a minimum elapsed time specification after which the alert is to be checked and/or issued. Another example of metadata is a specification of a region associated with the current location within which the alert is to be checked and/or issued (such as a radius around the current location, communication with a particular cellular tower and optionally other adjacent or nearby tower(s)), a city block associated with the current location, or city limits associated with a city associated with the current location). Another example of metadata is an indication of whether a region associated with the current location, for example as described above, must be left and returned to before the alert should trigger. Another example of metadata is a time of day or range of time of day (such as a starting and ending time). Another example of metadata is a day of the week. Another example of metadata is a day of the month. Another example of metadata is a replication rule, for example a rule specifying one or more external devices to which the rule can be replicated. Another example of metadata is a specification of a device on which an alert can be presented.

In some embodiments, metadata may be received, for example via a user interface or when receiving an alert request from an external device. In some embodiments, metadata may be determined, e.g. associated with an explicit or implicit default value without need for user input or explicit specification, such as half an hour or one hour for a minimum time, and/or half a mile, one mile, communicating with the same cellular tower as currently or recently communicated with, or one city block around the current location for a region, or requiring leaving a region associated with the alert before the alert should trigger.

A location associated with the alert may be adjusted (205). An example of adjusting the location is to provide a user interface allowing specification of the location, wherein the current location is associated with a default value, and receiving a change to that location via the user interface. For example, a map may be displayed with the current location indicated by a marker, and a drag event dragging the marker to an adjusted location may be received. In another example, a boundary of a region within which the alert may trigger may be displayed, and modifications such as dragging the boundary may be received and processed.

The location, message and metadata, as existent, may be associated together (206). An example of associating such information is to store it in a data structure in memory.

An alert may be created using the associated location, message and metadata, as existent (207). An example of creating such an alert is to create a record in an alert store 104 of FIG. 1.

Figure 3:
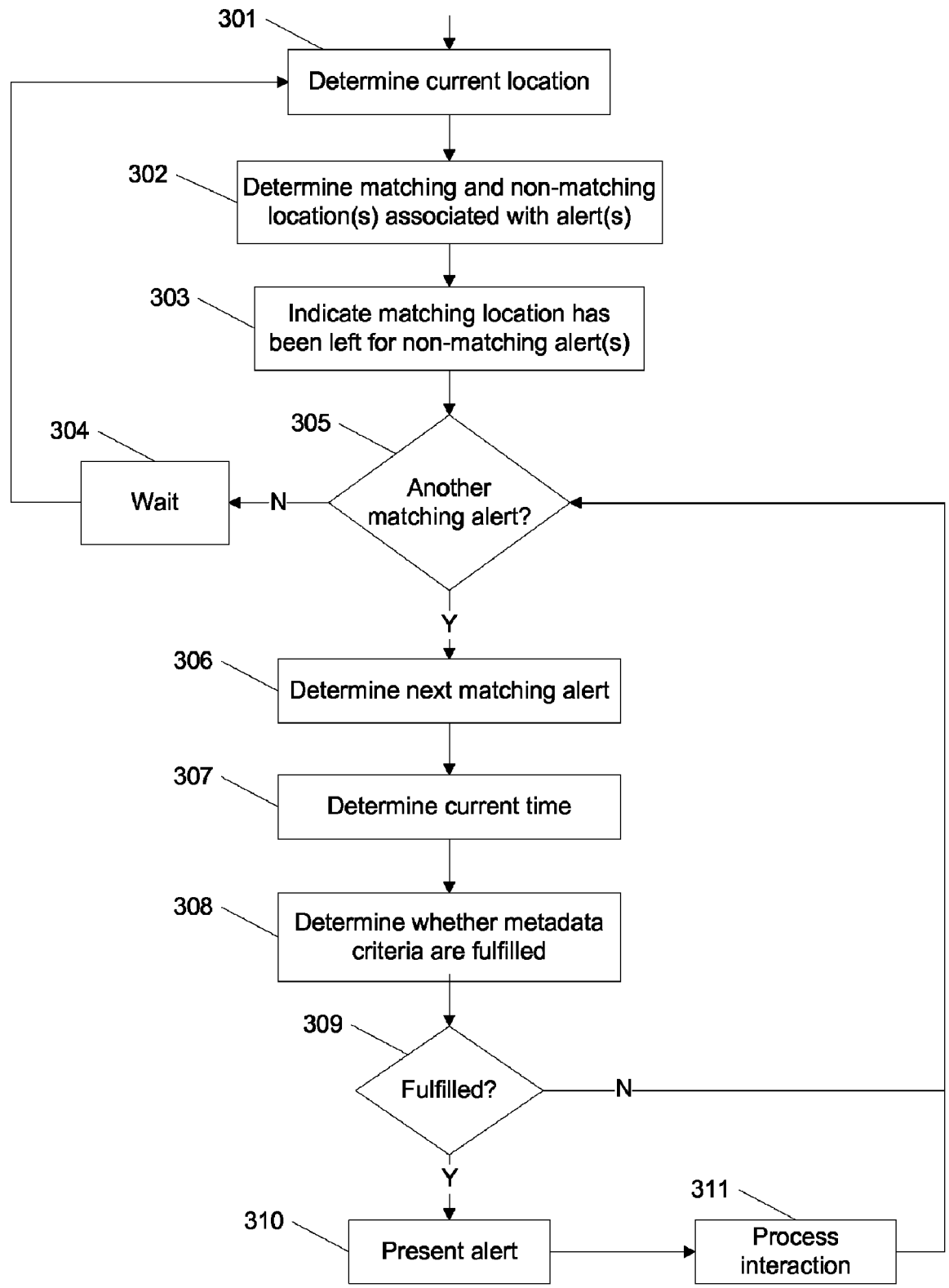
FIG. 3 is a flow diagram of a method for triggering an alert, according to some embodiments.

FIG. 3 is a flow diagram of a method for triggering an alert, according to some embodiments. In this example, a current location may be determined (301). An example of determining a current location is to detect or receive the current location, for example as described in conjunction with location sensor 103 of FIG. 1.

Zero or more alerts that match, and do not match, the current location may be determined (302). For example, a list of alerts may be consulted to determine whether the current location is within a region (either explicit or implicit) associated with each alert. Examples of such regions are discussed in conjunction with 204 of FIG. 2.

Data associated with zero or more alerts that are determined not to match the current location may be updated to indicate that a region that may trigger them (such as a radius from the location at which they were created) has been left since they were created (303). An example of updating data associated with an alert in this manner is to set a flag associated with the alert. In some embodiments, such data may be updated only for alert(s) that did not previously have such a flag set, and/or that have a metadata specification indicating that a region must be left and returned to for the alert to trigger.

If no more alerts that match the current location remain to be checked (305), then in this example a wait may be performed (304). An example of performing a wait is to wait a predetermined period of time, such as one second, ten seconds, or one minute. Another example of performing a wait is to wait until the current location has changed, for example by detecting such a change via an accelerometer. In some embodiments, while a wait is being performed, location-sensing hardware such as location sensor 103 may be powered down. A current location may again be determined (301).

If one or more alerts that match the current location remain to be checked (305), then in this example a next matching alert may be selected from them (306), for example at random or as the next matching alert in a list of alerts.

In some embodiments, a current time may be determined (307), for example by receiving a current time from a clock 106 of FIG. 1.

It may be determined whether one or more metadata criteria are fulfilled (308). An example of determining whether a metadata criterion is fulfilled is to determine whether a previous location since the alert was created was outside a trigger-enabling region associated with the alert, for example by determining whether a flag associated with the region has been set, or by checking a location history to determine whether a location in the history since the alert was created was outside the region. Another example of determining whether a metadata criterion is fulfilled is to determine whether a minimum amount of time has elapsed since the alert was created. Another example of determining whether a metadata criterion is fulfilled is to determine that the current time matches a time of day or range of time of day (such as being no earlier than a starting time and no later than an ending time). Another example of determining whether a metadata criterion is fulfilled is to determine whether the current day of the week matches a specified day of week. Another example of determining whether a metadata criterion is fulfilled is a to determine whether the current day of the month matches a specified day of the month.

If it is determined that one or more metadata criteria are unfulfilled (309), then in this example it is determined whether another alert that matches the current location remains to be checked (305). If it is determined that there are no relevant metadata criteria, or that relevant metadata criteria are fulfilled, for example that all metadata criteria, are fulfilled (309), then in this example an alert is presented (310). Examples of presenting an alert are discussed in conjunction with alert interaction user interface 105 of FIG. 1, and include visual, auditory, tactile, informational and/or hybrid presentation, as well as transmitting information related to the alert to an external device that is equipped to present and process the alert.

A user interaction with the presented alert may be received and processed (311). Examples of processing a user interaction are discussed in conjunction with alert interaction user interface 105 of FIG. 1, and include dismissing the alert, re-enabling the alert with a requirement that a trigger-enabling region associated with the alert must be left and returned to before the alert will trigger again, re-enabling the alert with a specified or predetermined minimum time elapsed from the current time, and modifying parameters such as metadata associated with the alert.

It may be determined whether another alert that matches the current location remains to be checked (305).

Figure 4:
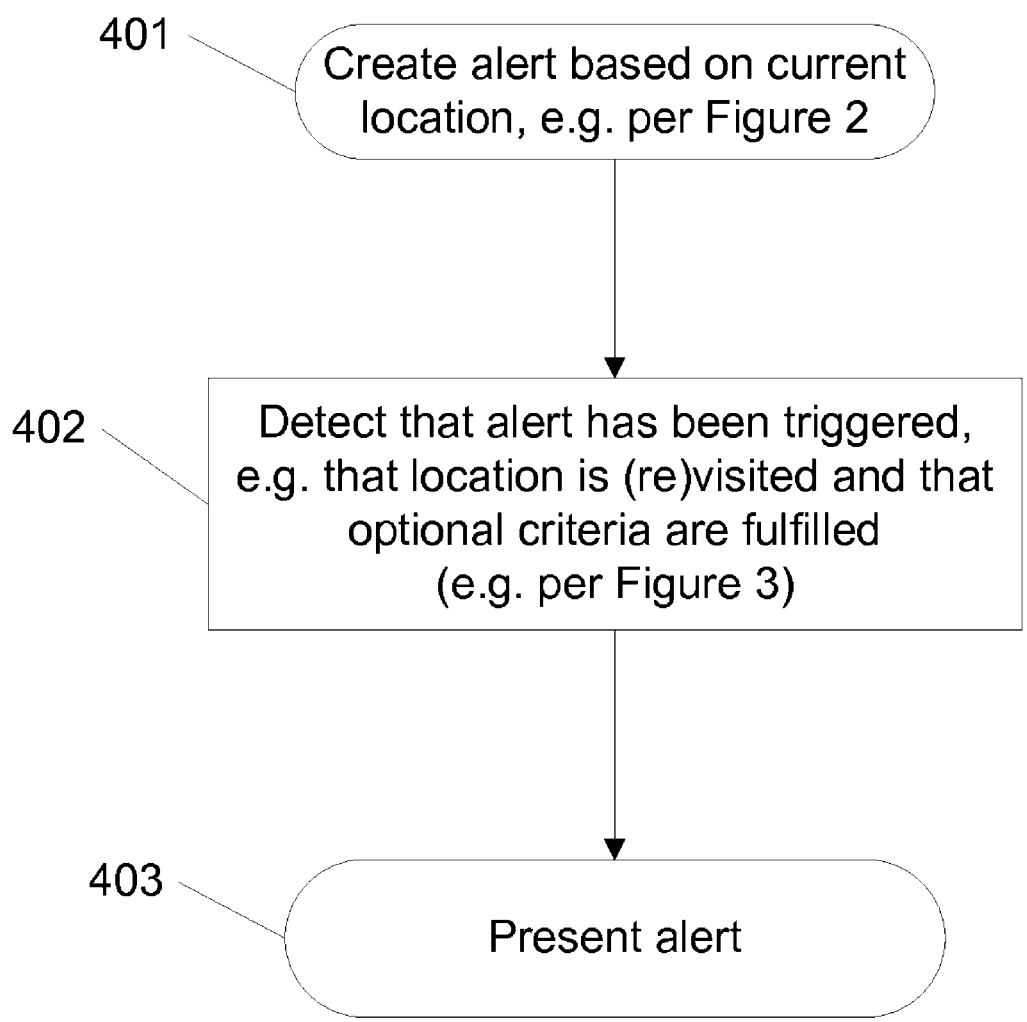
FIG. 4 is a flow diagram of a method for location-based alerting, according to some embodiments.

FIG. 4 is a flow diagram of a method for location-based alerting, according to some embodiments. In this example, an alert associated with a current location is created (401), for example as discussed in conjunction with FIG. 2.

The alert may be triggered (402). Examples of triggering an alert are discussed in conjunction with FIG. 3, and include determining that a current location matches the location associated with the alert, and that other criteria, if any, are met.

Information relating to the alert may be presented (403). Examples of presenting information relating to an alert are discussed in conjunction with alert interaction user interface 105 of FIG. 1, and include visual, auditory, tactile, informational and/or hybrid presentation, as well as transmitting information related to the alert to an external device that is equipped to present and process the alert.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method for processing an alert, comprising:
receiving a specification of a first location;
creating an alert;
associating the specification of the first location with the alert;

determining a first current location as a second location, wherein determining the second location follows receiving the specification of the first location and precedes determining a third location;

determining that the second location does not match the specification of the first location;

determining a second current location as the third location;

determining that the third location matches the specification of the first location; and presenting information relating to the alert.

2. The method of claim 1, wherein determining the first current location includes receiving an input associated with a global positioning satellite receiver.

3. The method of claim 1, wherein determining the second current location includes receiving an input associated with a global positioning satellite receiver.

4. The method of claim 1, wherein presenting the information relating to the alert includes a visual display.

5. The method of claim 1, wherein presenting the information relating to the alert includes an auditory signal.

6. The method of claim 1, wherein presenting the information relating to the alert includes vibrating.

7. The method of claim 1, wherein presenting the information relating to the alert includes transmitting information relating to the alert.

8. The method of claim 1, further comprising receiving a message, and wherein the information relating to the alert includes the message.

9. The method of claim 1, further comprising receiving a time specification and associating the time specification with the alert; and further comprising determining a current time, and determining that the current time matches the time specification.

10. The method of claim 9, wherein the time specification includes a starting time and an ending time.

11. The method of claim 9, wherein the time specification includes a day.

12. The method of claim 9, wherein the time specification includes a time of day.

13. The method of claim 1, further comprising determining a first current time and associating the first current time with the alert; and further comprising determining a second current time, and determining that a difference between the first current time and the second current time exceeds a threshold.

14. The method of claim 1, wherein determining that the third location matches the specification of the first location includes determining that a distance between the first location and the third location does not exceed a threshold.

15. The method of claim 1, wherein determining that the third location matches the specification of the first location includes determining that the third location is within a region, wherein the region is associated with the specification of the first location.

16. The method of claim 1, wherein the specification of the first location is received from a user.

17. The method of claim 1, wherein receiving the specification of the first location includes displaying a map and enabling placement of a marker at a location thereon.

18. The method of claim 1, wherein receiving the specification of the first location includes displaying a map with a boundary of a region thereon, and receiving modifications to the boundary.

19. A system for processing an alert, comprising:
a processor configured to:
    receive a specification of a first location;
    create an alert;
    associate the specification of the first location with the alert;
    determine a first current location as a second location, wherein
    determining the second location follows receiving the specification of the first location and precedes determining a third location;
    determine that the second location does not match the specification of the first location;
    determine a second current location as the third location;
    determine that the third location matches the specification of the first location; and
    present information relating to the alert; and
a memory coupled with the processor, wherein the memory provides instructions to the processor.

20. The system of claim 19, wherein determining the first current location includes receiving an input associated with a global positioning satellite receiver.

21. The system of claim 19, wherein determining the second current location includes receiving an input associated with a global positioning satellite receiver.

22. The system of claim 19, wherein presenting the information relating to the alert includes a visual display.

23. The system of claim 19, wherein presenting the information relating to the alert includes an auditory signal.

24. The system of claim 19, wherein presenting the information relating to the alert includes vibrating.

25. The system of claim 19, wherein presenting the information relating to the alert includes transmitting information relating to the alert.

26. The system of claim 19, wherein the processor is further configured to receive a message, and wherein the information relating to the alert includes the message.

27. The system of claim 19, wherein the processor is further configured to receive a time specification and associate the time specification with the alert; and wherein the processor is further configured to determine a current time, and determine that the current time matches the time specification.

28. The system of claim 27, wherein the time specification includes a starting time and an ending time.

29. The system of claim 27, wherein the time specification includes a day.

30. The system of claim 27, wherein the time specification includes a time of day.

31. The system of claim 19, wherein the processor is further configured to determine a first current time and associate the first current time with the alert; and wherein the processor is further configured to determine a second current time, and determine that a difference between the first current time and the second current time exceeds a threshold.

32. The system of claim 19, wherein determining that the third location matches the specification of the first location includes determining that a distance between the first location and the third location does not exceed a threshold.

33. The system of claim 19, wherein determining that the third location matches the specification of the first location includes determining that the third location is within a region, wherein the region is associated with the specification of the first location.

34. The system of claim 19, wherein the specification of the first location is received from a user.

35. The system of claim 19, wherein receiving the specification of the first location includes displaying a map and enabling placement of a marker at a location thereon.

36. The system of claim 19, wherein receiving the specification of the first location includes displaying a map with a boundary of a region thereon, and receiving modifications to the boundary.

37. A computer program product for processing an alert, the computer program product being embodied in a computer readable storage medium and comprising computer instructions for:
- receiving a specification of a first location;
- creating an alert;
- associating the specification of the first location with the alert;
- determining a first current location as a second location, wherein determining the second location follows receiving the specification of the first location and precedes determining a third location;
- determining that the second location does not match the specification of the first location;
- determining a second current location as the third location;
- determining that the third location matches the specification of the first location; and
- presenting information relating to the alert.

38. The computer program product of claim 37, wherein determining the first current location includes receiving an input associated with a global positioning satellite receiver.

39. The computer program product of claim 37, wherein determining the second current location includes receiving an input associated with a global positioning satellite receiver.

40. The computer program product of claim 37, wherein presenting the information relating to the alert includes a visual display.

41. The computer program product of claim 37, wherein presenting the information relating to the alert includes an auditory signal.

42. The computer program product of claim 37, wherein presenting the information relating to the alert includes vibrating.

43. The computer program product of claim 37, wherein presenting the information relating to the alert includes transmitting information relating to the alert.

44. The computer program product of claim 37, wherein the computer program product further comprises computer instructions for receiving a message, and wherein the information relating to the alert includes the message.

45. The computer program product of claim 37, wherein the computer program product further comprises computer instructions for receiving a time specification and associating the time specification with the alert; and wherein the computer program product further comprises computer instructions for determining a current time, and determining that the current time matches the time specification.

46. The computer program product of claim 45, wherein the time specification includes a starting time and an ending time.

47. The computer program product of claim 45, wherein the time specification includes a day.

48. The computer program product of claim 45, wherein the time specification includes a time of day.

49. The computer program product of claim 37, wherein the computer program product further comprises computer instructions for determining a first current time and associating the first current time with the alert; and wherein the computer program product further comprises computer instructions for determining a second current time, and determining that a difference between the first current time and the second current time exceeds a threshold.

50. The computer program product of claim 37, wherein determining that the third location matches the specification of the first location includes determining that a distance between the first location and the third location does not exceed a threshold.

51. The computer program product of claim 37, wherein determining that the third location matches the specification of the first location includes determining that the third location is within a region, wherein the region is associated with the specification of the first location.

52. The computer program product of claim 37, wherein the specification of the first location is received from a user.

53. The computer program product of claim 37, wherein receiving the specification of the first location includes displaying a map and enabling placement of a marker at a location thereon.

54. The computer program product of claim 37, wherein receiving the specification of the first location includes displaying a map with a boundary of a region thereon, and receiving modifications to the boundary.

* * * * *